(12) United States Patent
Simpson et al.

(10) Patent No.: US 8,668,812 B2
(45) Date of Patent: *Mar. 11, 2014

(54) SUPERHYDROPHOBIC COATED APPARATUS FOR LIQUID PURIFICATION BY EVAPORATIVE CONDENSATION

(75) Inventors: John T. Simpson, Clinton, TN (US); Steve R. McNeany, Knoxville, TN (US); Thomas V. Dinsmore, Knoxville, TN (US); Scott R. Hunter, Oak Ridge, TN (US); Ilia N. Ivanov, Knoxville, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 488 days.

This patent is subject to a terminal disclaimer.

(21) Appl. No.: 13/030,535

(22) Filed: Feb. 18, 2011

(65) Prior Publication Data
US 2012/0211346 A1 Aug. 23, 2012

(51) Int. Cl.
C02F 1/04 (2006.01)
C02F 1/14 (2006.01)
B01D 3/06 (2006.01)

(52) U.S. Cl.
USPC ........ 202/185.1; 202/163; 202/234; 202/241; 202/267.1; 203/10; 203/86; 159/29; 159/903

(58) Field of Classification Search
USPC ......... 202/163, 185.1, 190, 234, 241, DIG. 1, 202/267.1; 203/10, 12, 86, DIG. 1, DIG. 17; 159/29, 903
See application file for complete search history.

(56) References Cited

U.S. PATENT DOCUMENTS

| | | | | |
|---|---|---|---|---|
| 3,351,536 A | * | 11/1967 | Fox | 202/83 |
| 3,960,668 A | * | 6/1976 | Rush | 202/185.1 |
| 4,194,949 A | * | 3/1980 | Stark | 202/180 |
| 4,210,121 A | * | 7/1980 | Stark | 126/573 |
| 4,249,516 A | * | 2/1981 | Stark | 126/601 |
| 4,383,891 A | * | 5/1983 | Clavier | 202/234 |
| 4,933,046 A | * | 6/1990 | May | 202/185.3 |
| 5,098,566 A | | 3/1992 | Lefebvre | |
| 6,800,354 B2 | * | 10/2004 | Baumann et al. | 428/141 |
| 6,945,063 B2 | | 9/2005 | Max | |
| 7,150,904 B2 | | 12/2006 | D'Urso et al. | |
| 7,258,731 B2 | | 8/2007 | D'Urso et al. | |
| 7,638,182 B2 | | 12/2009 | D'Urso et al. | |
| 7,707,854 B2 | | 5/2010 | D'Urso | |
| 7,754,279 B2 | | 7/2010 | Simpson et al. | |
| 7,887,934 B2 | * | 2/2011 | Gentleman et al. | 428/697 |
| 7,892,660 B2 | * | 2/2011 | Gentleman et al. | 428/697 |
| 7,897,271 B2 | * | 3/2011 | Gentleman et al. | 428/697 |

(Continued)

FOREIGN PATENT DOCUMENTS

AT 504995 A1 9/2008
DE 102008014272 A1 9/2009

(Continued)

*Primary Examiner* — Nina Bhat
*Assistant Examiner* — Jonathan Miller
(74) *Attorney, Agent, or Firm* — Colin L. Cini; UT-Battelle, LLC

(57) ABSTRACT

Disclosed are examples of apparatuses for evaporative purification of a contaminated liquid. In each example, there is a first vessel for storing the contaminated fluid. The first vessel includes a surface coated with a layer of superhydrophobic material and the surface is at least partially in contact with the contaminated liquid. The contaminants do not adhere to the surface as the purified liquid evaporates, thus simplifying maintenance of the apparatus.

13 Claims, 6 Drawing Sheets

(56) References Cited

U.S. PATENT DOCUMENTS

| | | |
|---|---|---|
| 7,901,798 B2 * | 3/2011 | Gentleman et al. ............ 428/697 |
| 7,977,267 B2 * | 7/2011 | Gentleman et al. ............ 501/152 |
| 8,419,904 B2 * | 4/2013 | Ba-abbad et al. ................ 203/10 |
| 2004/0140270 A1 * | 7/2004 | Simmons ....................... 210/774 |
| 2004/0236168 A1 | 11/2004 | Max et al. |
| 2006/0076294 A1 | 4/2006 | Sirkar et al. |
| 2006/0257643 A1 | 11/2006 | Birger |
| 2007/0028588 A1 | 2/2007 | Varanasi et al. |
| 2007/0184247 A1 | 8/2007 | Simpson et al. |
| 2007/0256430 A1 | 11/2007 | Prueitt |
| 2008/0286556 A1 | 11/2008 | D'Urso et al. |
| 2008/0296252 A1 | 12/2008 | D'Urso et al. |
| 2009/0042469 A1 | 2/2009 | Simpson |
| 2010/0021692 A1 * | 1/2010 | Bormashenko et al. ....... 428/172 |
| 2010/0021745 A1 | 1/2010 | Simpson et al. |
| 2010/0143620 A1 | 6/2010 | Ajdelsztajn et al. |
| 2010/0286582 A1 | 11/2010 | Simpson et al. |

FOREIGN PATENT DOCUMENTS

| | | |
|---|---|---|
| GB | 2229379 A | 9/1990 |
| WO | 2009034359 A1 | 3/2009 |
| WO | 2009051735 A2 | 4/2009 |

* cited by examiner

US 8,668,812 B2

SUPERHYDROPHOBIC COATED APPARATUS FOR LIQUID PURIFICATION BY EVAPORATIVE CONDENSATION

STATEMENT REGARDING FEDERALLY SPONSORED RESEARCH AND DEVELOPMENT

This invention was made with government support under Contract No. DE-AC05-000822725 awarded by the U.S. Department of Energy. The government has certain rights in the invention.

THE NAMES OF THE PARTIES TO A JOINT RESEARCH AGREEMENT

None.

BACKGROUND OF THE INVENTION

1. Field of the Invention

The present disclosure relates to evaporative purification of liquids and more particularly to enhancing the separation and removal of contaminants from an apparatus used for evaporative purification.

2. Description of the Related Art

Evaporation is the process that spontaneously transforms molecules from a liquid phase into a vapor phase. Various factors influence the speed at which molecules will evaporate. Since evaporation only occurs at the surface of a liquid, influencing the factors that allow a molecule to easily break away from the inter-molecular forces bonding the liquid together will speed up evaporation. For instance, if the liquid is heated, then its molecules have a higher average kinetic energy and evaporation will occur much faster.

Evaporation is useful in many industrial applications for separating solids from liquids and/or purifying liquids. For example, lithium, which is used in electric vehicle batteries, is extracted from large salt brine deposits after the liquid has evaporated. In another example, the process of evaporation desalination extracts pure water from sea water for drinking and cooking where fresh water is scarce. In one example of this process, sea water is piped through cooling coils in the top of a vessel before being introduced into the bottom of the vessel. The sea water in the vessel is then heated. The evaporating water molecules are then condensed by the cooling coils and purified water is collected for drinking. Any heating source, such as solar energy, natural gas, oil, nuclear power, or electrical heating (including use of resistive heating elements, microwave systems or other radiative techniques) may be used to heat the vessel and keep the process working continuously.

During the evaporative desalination process, the concentration of salt in the remaining brine solution will increase due to the loss of the water. Eventually, the dissolved salts will crystallize and deposit as a salt scale on the desalination equipment itself. The scale will eventually harden in and on the equipment, making removal extremely difficult, especially inside of pumps, pipes, valves, and other, difficult to clean, areas. We have observed that the salt deposition not only coats the container containing the salt brine, but it also climbs up the walls of such containers and ends up coating areas far away from the actual brine container.

In the book "Evaporation for desalination—scale prevention and removal", Polytechnic Institute of Brooklyn, New York, N.Y. USA 1966, author Donald F. Othmer teaches that an inexpensive concentrate of a vegetable extract has been found to prevent scale formation in evaporators or boilers using sea water or hard waters from inland sources when used in amounts of one part to 50,000 to 100,000 of water with scale forming constituents which then form flocculent precipitates. Using slightly higher concentrations, scale, even when several inches thick is softened, to give the same sludge which is then blown down. A passivating action of the material appears to prevent corrosion of mild steel by sea water at these same temperatures, up to 350° F., at which scale formation is prevented.

U.S. Pat. No. 4,342,652 teaches that an effective amount of a copolymer of maleic acid or anhydride and allyl sulfonic acid when added to the water to be treated provides increased inhibition of scale formation in evaporative desalination units.

Despite these teachings, further enhancements to the prevention of contaminant scale formation in evaporative purification equipment are needed.

BRIEF SUMMARY OF THE INVENTION

Disclosed are examples of apparatuses for evaporative purification of contaminated liquids. In each example, there is a first vessel for storing the contaminated fluid. The first vessel includes a surface coated with a layer of superhydrophobic material and the surface is at least partially in contact with the contaminated liquid. The contaminants do not adhere to the surface as the liquid evaporates, thus simplifying maintenance of the apparatus and significantly reducing salt contamination and resulting corrosion of the surrounding structure and support equipment.

BRIEF DESCRIPTION OF THE SEVERAL VIEWS OF THE DRAWINGS

A more complete understanding of the preferred embodiments will be more readily understood by reference to the following detailed description when considered in conjunction with the accompanying drawings.

DETAILED DESCRIPTION OF THE INVENTION

Superhydrophobic coatings function by pinning a very thin layer of air to the exposed surface of the coating, thus preventing contact between a liquid and the underlying substrate. Superhydrophobic coated surfaces typically create contact angles of about 150° or greater between the surface and the droplet of liquid. Conversely, simple hydrophobic coatings create no such air layer and; therefore, do not perform as well.

Examples of high quality superhydrophobic coating compositions, coated articles and coating application methods may be found in U.S. Pat. No. 7,150,904 'Composite, Ordered Material Having Sharp Surface Features'; U.S. Pat. No. 7,258,731 'Composite, Nanostructured, Super-Hydrophobic Material'; U.S. Pat. No. 7,638,182 'Method for Producing Microchannels in Drawn Material'; U.S. Pat. No. 7,707,854 'Method of Producing Microchannel and Nanochannel Articles; U.S. Pat. No. 7,754,279 'Article Coated With Flash Bonded Superhydrophobic Particles'; US Patent Application 2007/0184247 'Transparent, Super-Hydrophobic, Disordered Composite Material'; US Patent Application 2008/0286556 'Super-Hydrophobic Water Repellant Powder'; US Patent Application 2008/0296252 'Composite, Nanostructured, Super-Hydrophobic Material'; US Patent Application 2009/0042469 'Superhydrophilic and Superhydrophobic Powder Coated Fabric'; US Patent Application 2010/0021745 Superhydrophobic Diatomaceous Earth'; and US Patent Application 2010/0286582 'Superhydrophobic, Diatomaceous Earth Comprising Bandages and Method of Making the Same' with each being incorporated herein by reference as if included at length.

Figure 1:
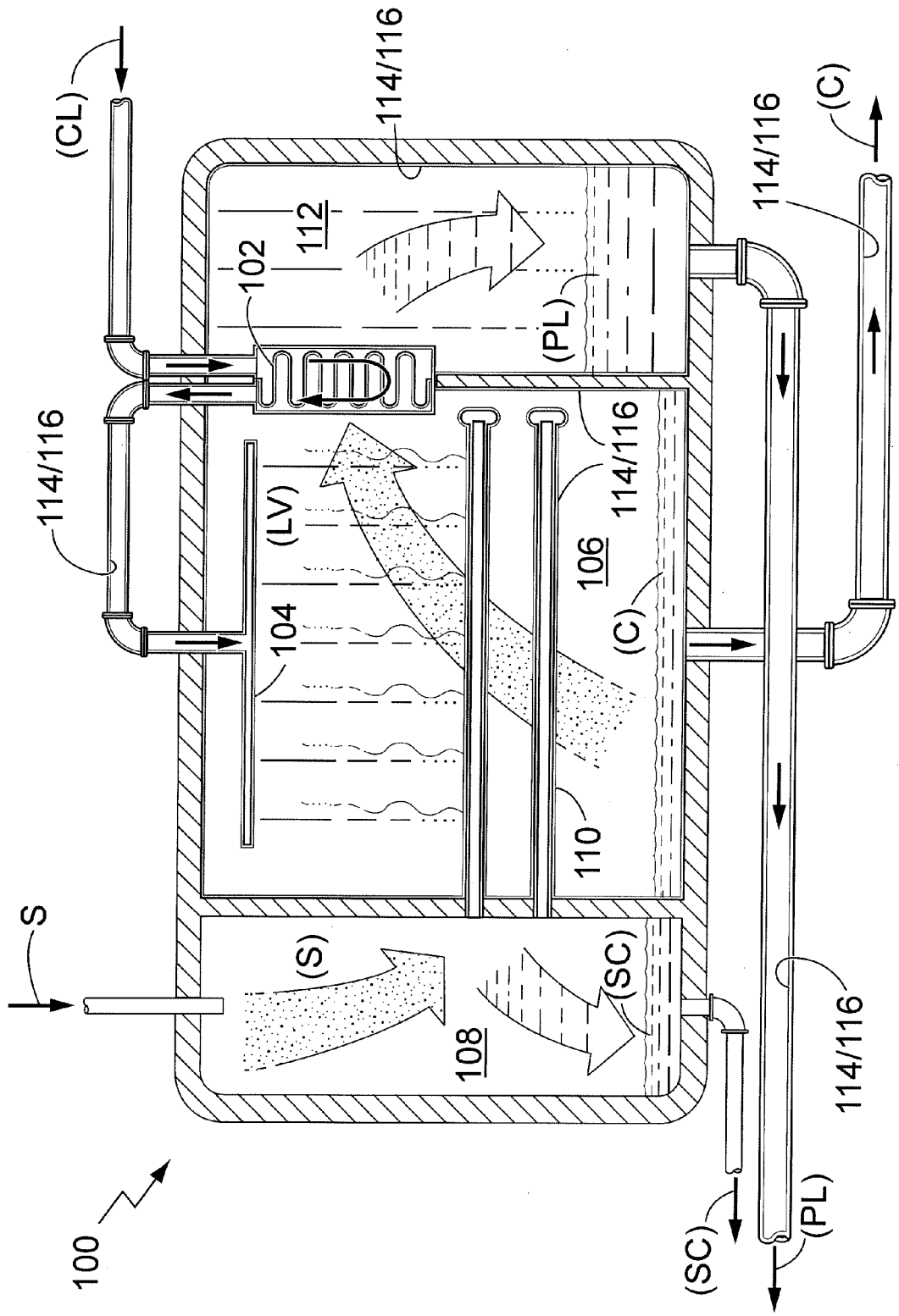
FIG. 1 is a simplified schematic view of a single-stage flash evaporation seawater desalination unit with surfaces coated with a superhydrophobic material.

Referring first to FIG. 1, a simplified, single-stage flash evaporation seawater desalination unit 100 is schematically illustrated. Although typical desalination plants contain multiple stages of evaporators in series for improved efficiency, only a single stage evaporator is illustrated here for simplicity. Here, contaminated liquid (CL), seawater in this example, enters a condensing conduit 102 and is then directed to a manifold 104 where it is discharged into the top of a first vessel 106. Steam (S) enters an adjacent steam chamber 108 and is then directed within the first vessel 106 through a series of enclosed tubes 110. The discharged, contaminated liquid (CL) contacts the steam-heated tubes 110 and evaporates as liquid vapors (LV). The liquid vapors (LV) pass through the condensing conduit 102, where it is condensed into a purified liquid (PL) state and collected in a second vessel 112. The accumulated steam condensate (SC), contaminants (C), and purified liquid (PL) eventually discharge through piping connected to the steam chamber 108, first vessel 106, and second vessel 112 respectively.

Figure 2:
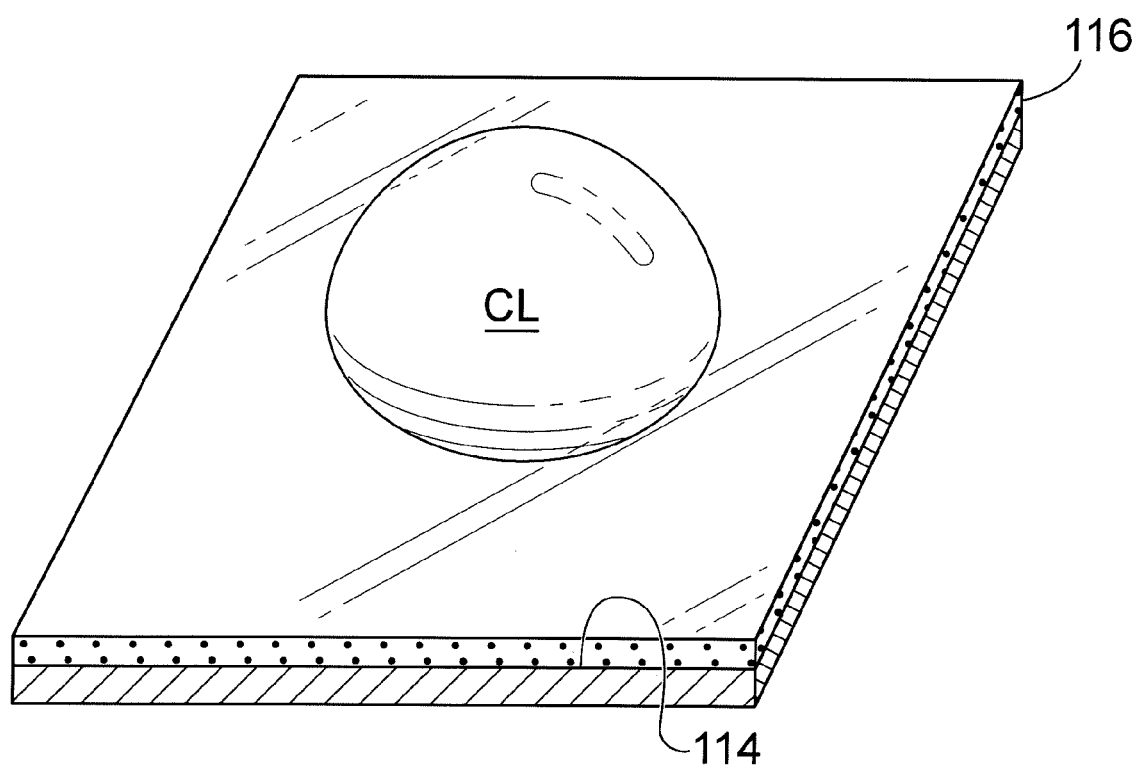
FIG. 2 is a detailed view of a surface coated with superhydrophobic material as implemented in the various examples.

Within the desalination unit 100 there are one or more surfaces 114, as depicted in FIG. 2, which come into at least partial contact with contaminated liquid (CL) or contaminants (C). These surfaces 114 have a layer of superhydrophobic material 116 applied to them for preventing contaminated liquid (CL) and contaminants (C) from adhering to the underlying substrate. This is particularly important for contaminants (C) such as salt or lithium, as these tend to crystallize at high concentrations and adhere to untreated surfaces. The superhydrophobic material layers 116 may be formulated, produced and applied to the surfaces as described in the above-incorporated references for example. Other superhydrophobic materials may similarly provide benefits. The superhydrophobic material layers 116 are applied to any flat, curved, concave, convex, interior, exterior, tubular, finned, perforated, or other shaped surface 114 that at least partially contacts the contaminated liquid (CL) or the contaminants (C). In some examples, the superhydrophobic material layers 116 are applied to surfaces that at least partially contacts the purified liquid (PL) as well.

While the example of FIG. 1 illustrates a single-stage flash evaporation seawater desalination unit 100, it is to be understood that the teachings of this disclosure may be applied to other evaporation systems as well. Industrial production systems such as a solid-liquid separation systems and chemical production systems will similarly benefit from this disclosure.

Figure 3:
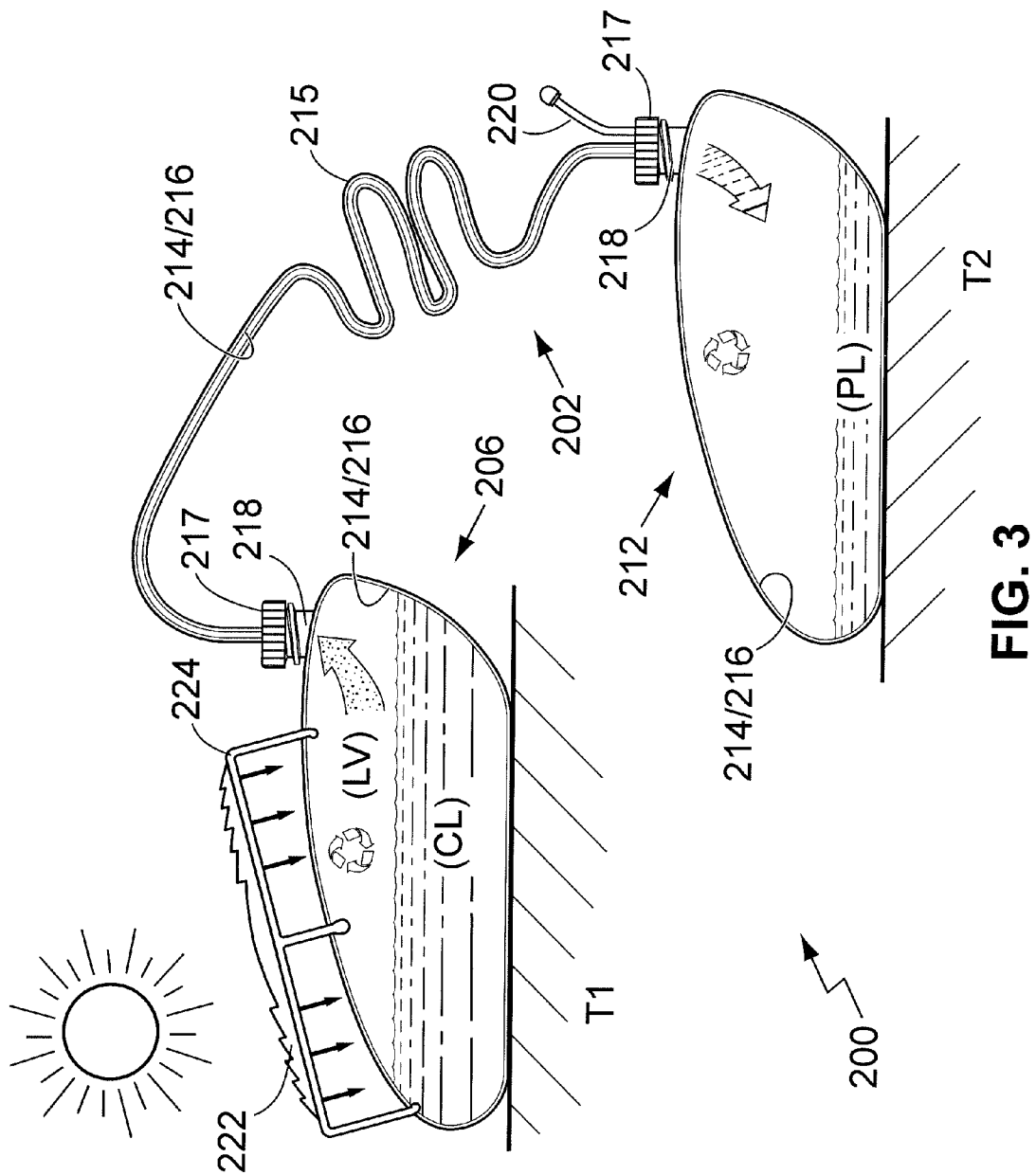
FIG. 3 is an example of a personal liquid purification system with surfaces coated with superhydrophobic materials.
Figure 4:
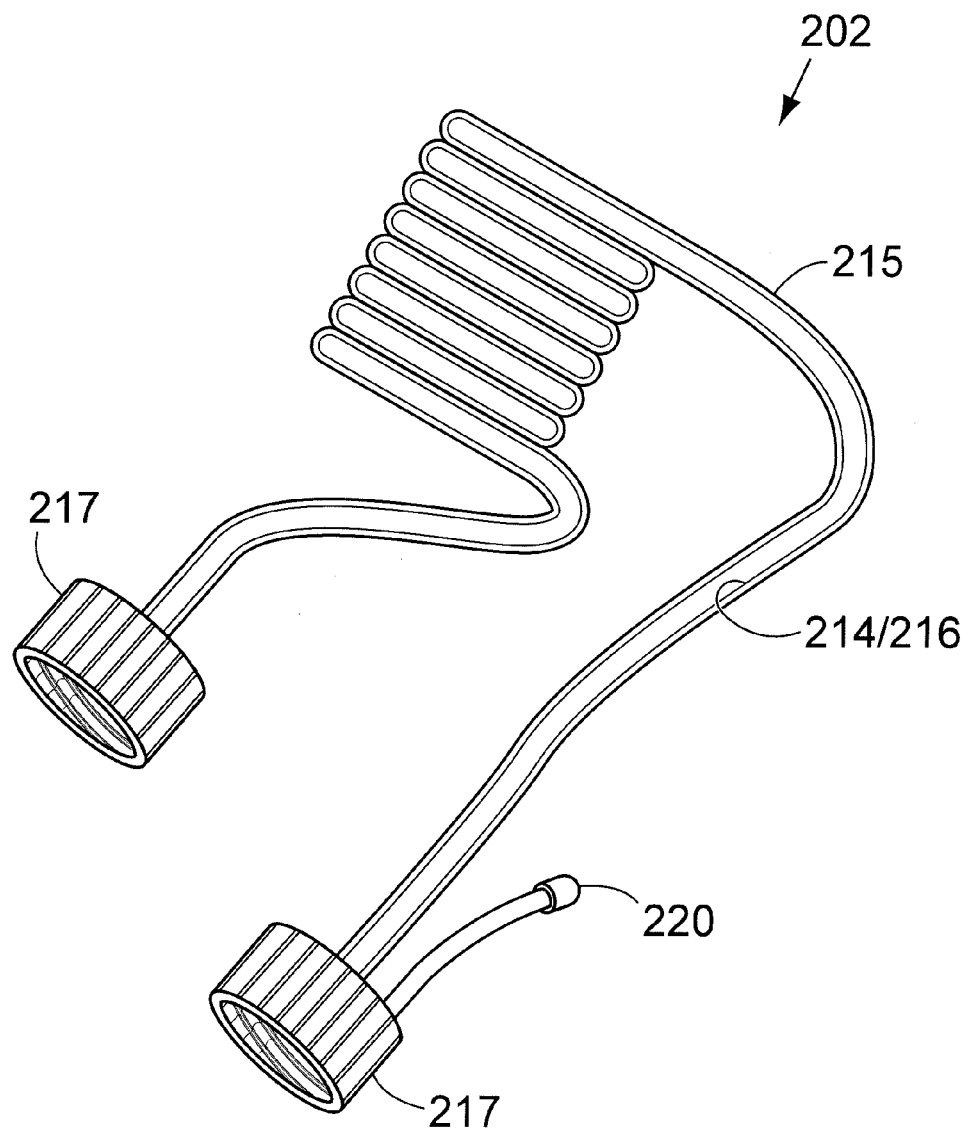
FIG. 4 is an example of a condensation conduit of the type used in the personal liquid purification system of FIG. 3.
Figure 5:
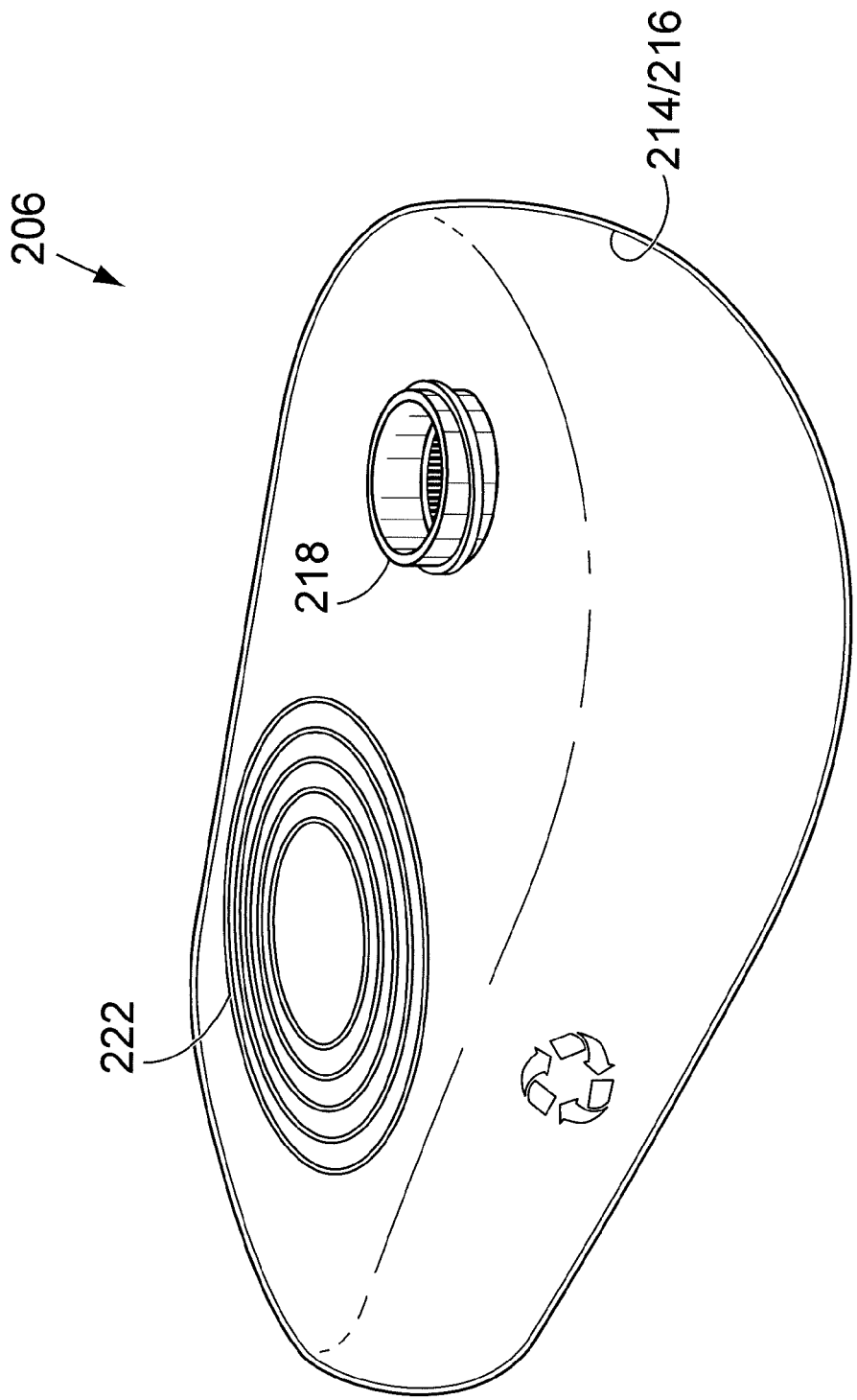
FIG. 5 is an example of a first vessel of the type used in the personal liquid purification system of FIG. 3.

Referring now to FIGS. 3-5, a personal, liquid purification device 200 is illustrated. This device 200 is compact, low cost, and may be used to purify liquid for one or more individuals. A first vessel 206 and a second vessel 212 are fluidly connected by a condensing conduit 202. The vessels 206, 212 may be made of glass material, or rigid plastic material, or flexible plastic material, with clear, foldable, or collapsible, recyclable plastic being the most preferred material. The condensing conduit 202 may be made of rigid or flexible plastic material and includes a tubular body 215 for transferring liquid vapors from the first vessel 206 to the second vessel 212, a rigid cap 217 on each end for securing the tubular body 215 to threaded fittings 218 on the vessels 206, 212, and a pressure relief vent 220 for releasing any vapor pressure accumulated in the unit to the atmosphere.

In the examples of FIGS. 3 and 5, a heating device is used to raise the temperature of the contaminated liquid (CL) in said first vessel 206. In the first example, a Fresnel lens 222 takes a large area of sunlight and directs it towards the first vessel 206 by bending rays of sunlight and focusing them into a narrow area. The Fresnel lens 222 is mounted above the first vessel 206 with a support 224 in the example of FIG. 3, and in the example of FIG. 5 the Fresnel lens 222 is integrally molded into or bonded onto the first vessel 206 with an adhesive material. The Fresnel lens 222 focuses solar radiation at the contaminated liquid (CL) in the first vessel 206, thus raising its temperature and increasing its evaporation rate.

In the present example, all the interior surfaces 214 of the first and second vessels 206, 212 and the condensing conduit 202 are coated with a layer of superhydrophobic material 216 as described above. The layer of superhydrophobic material 216 prevents contaminated liquid (CL) and contaminants (C) from adhering to the interior surfaces 214 of the personal, liquid purification device 200. Cleaning is simply a matter of inverting the vessels 206, 212 and allowing the contaminants (C) to discharge though the threaded fittings 218. The condensing conduit 202 is cleaned by shaking and allowing any contaminants (C) to discharge.

The personal, liquid purification device 200 will purify liquids such as salt water, contaminated water, or hard water for one or more individuals while in the field or in an emergency situation. The condensing conduit 202 is first attached to the threaded fitting 218 on the second vessel 212 by threading the rigid cap 217 clockwise. Contaminated liquid (CL) is then added to the first vessel 206 through the fitting 218 to a level below the fitting 218 itself. The free end of the condensing conduit 202 is then attached to the fitting 218 on the first vessel 206 by threading the rigid cap 217 clockwise. The first vessel 206 is placed on a warm surface or in the warm sunlight. In a preferred approach, sunlight is focused on the first vessel 206 by the Fresnel lens 222, which is mounted above, or is integral with, the first vessel 206.

As the heat energy from the sunlight warms the first vessel 206, molecules of the contaminated liquid (CL) begin to evaporate as liquid vapors (LV) and migrate into the condensing conduit 202. The liquid vapor (LV) begins to condense into purified liquid (PL) in the condensation tube 202 and then flows into the second vessel 212. It is beneficial to maintain a first vessel 206 temperature (T1) that is greater than the second vessel 212 temperature (T2). By maintaining the first vessel 206 at a temperature (T1) that is greater than the temperature (T2) of the second vessel 212, the evaporation condensation cycle is completed much faster. Once a sufficient volume of purified liquid (PL) is condensed, the condensation conduit 202 is removed from the first and second vessels 206, 212. The remaining contaminated liquid (CL) and contaminants (C) are easily discharged from the first vessel 206, leaving no residue, because of the layer of superhydrophobic material 216. The purified liquid (PL) in the second vessel 212 is available for personal hydration, food preparation or some other purpose.

Figure 6:
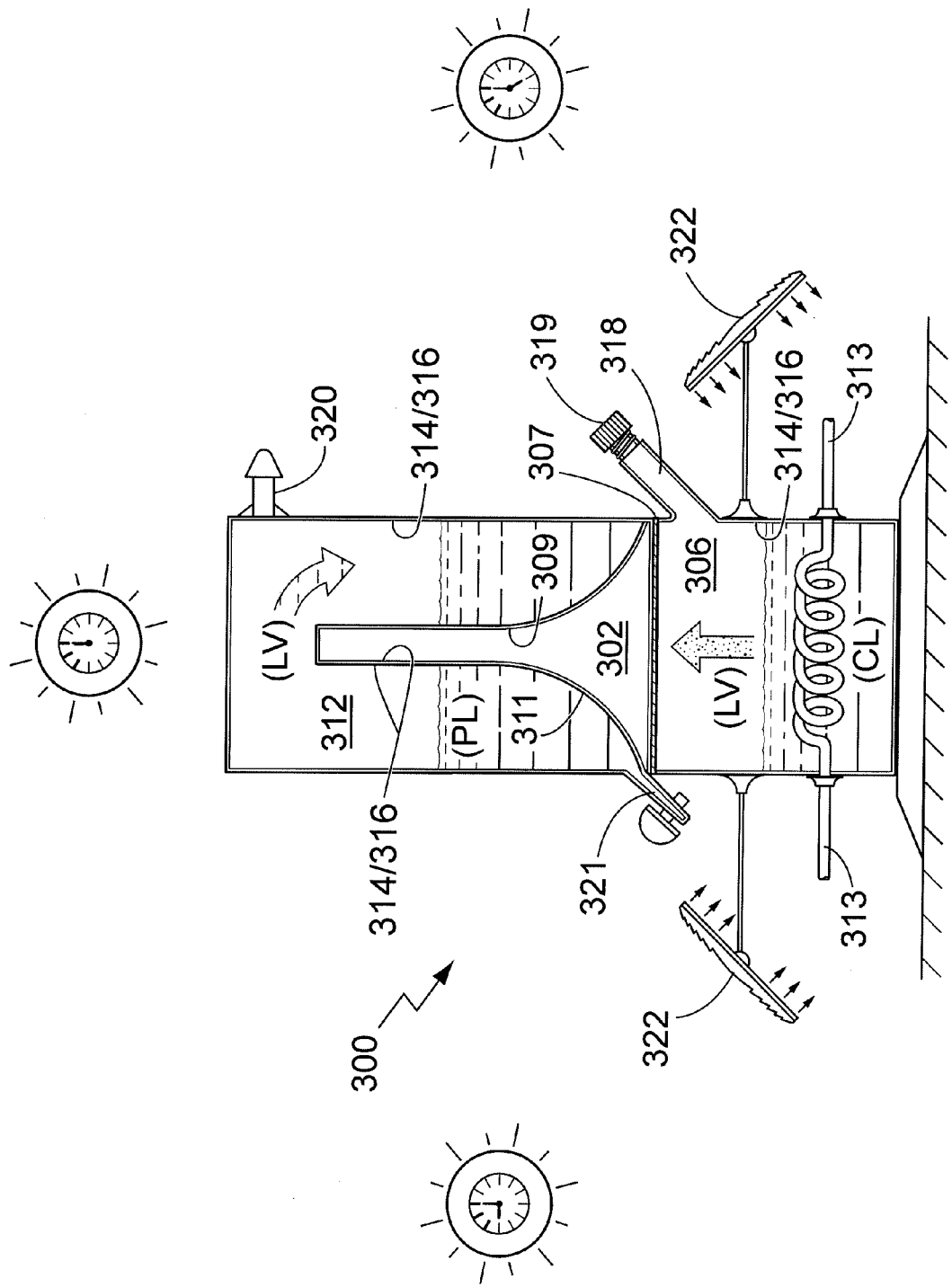
FIG. 6 is a tower-style liquid purification system with surfaces coated with superhydrophobic materials.

Another example of a personal, liquid purification device 300 is illustrated in FIG. 6. In this example, the first vessel 306, the condensing conduit 302 and the second vessel 312 are integrated into a two chamber, tower design. The lower chamber includes the first vessel 306 for storing the contaminated liquid (CL) and the integrated, upper chamber includes the second vessel 312 for storing the purified liquid (PL). In some examples, the first and second vessels 306, 312 are a cohesive structure and in other examples, the first and second vessels 306, 312 connect together at a joint 307 such as a coupling, a press fit or a threaded union. A tulip-shaped condensing conduit 302 transfers liquid vapor (LV) from the lower, first vessel 306 to the upper, second vessel 312. An inner surface 309 of the condensing conduit 302 contacts the liquid vapors (LV) and an outer surface 311 contacts the purified liquid (PL). In the example shown, the first and second vessels 306, 312 are cylindrical shaped, but other shapes are also contemplated.

One or more Fresnel lenses 322 are attached to the device 300 for concentrating solar energy at one or more heating elements 313 disposed in the first vessel 306 and in contact with the contaminated liquid (CL). An exemplary heating element 313 is of the tubular type and made of a Nickel-Chromium material. Each Fresnel lens 322 takes a large area of sunlight and directs it towards the heating elements 313 by bending the rays of light and focusing them. As the heating element warms, heat is transferred to the contaminated liquid (CL) stored in the first vessel 306. By using multiple Fresnel lenses 322 and heating elements 313, the sun's energy may be harnessed over a longer period of time. In the example, the sunlight is harnessed from 9:00 am to 5:00 pm.

A threaded fitting 318 and a rigid cap 319 in the first vessel 306 enables contaminated liquid (CL) to be poured into and out of the first vessel 306. A valve 321 in the second vessel 312 allows purified liquid (PL) to be poured out of the second vessel 312. A pressure vent 320 in the second vessel 312 allows any excess vapor pressure to escape from the second vessel 312 to the atmosphere. Because one or more heating elements 313 are used to increase the temperature of the contaminated liquid (CL), the first and second vessels 306, 312 need not be transparent. For example, the first vessel 306 may be painted a dark color (e.g., black) to absorb solar radiation to increase the temperature, while the second vessel 312 may be painted a light color (e.g., white or silver) to reflect solar radiation to reduce the temperature.

In the present example, the interior surfaces 314 of the first and second vessels 306, 312 and the inner and outer surfaces 309, 311 of the condensing conduit 302 are coated with a superhydrophobic coating layer 316 as described above. The superhydrophobic coating layer 316 prevents contaminated liquid (CL) and contaminants (C) from adhering to the interior surfaces 314 of the personal, liquid purification device 300. Cleaning is simply a matter of turning the vessels 306, 312 over and letting the contaminants (C) discharge from the fittings 318.

As the heat energy from the sunlight is focused by the Fresnel lenses 322 at the heating elements 313, molecules of the unpurified liquid (CL) are heated. Once heated, the contaminated liquid (CL) begins to evaporate as liquid vapor (LV), migrating into the tulip-shaped condensing conduit 302. The liquid vapor (LV) then condenses and accumulates into purified liquid (PL) in the second vessel 312. It is beneficial to maintain a first vessel 306 temperature (T1) that is greater than the second vessel 312 temperature (T2) with the use of dark coloring on the first vessel 306 and light coloring on the second vessel 312. By maintaining the first vessel 306 at a temperature (T1) that is greater than the temperature (T2) of the second vessel 312, the evaporation condensation cycle is completed much faster. Once a sufficient volume of purified liquid (PL) is condensed, the purified liquid (PL) is available for personal hydration, food preparation or some other purpose via valve 321. The remaining contaminated liquid (CL) and contaminants (C) are easily discharged from the first vessel 306 via the threaded fitting 318, leaving no residue, because of the layer of superhydrophobic material 316.

In order to demonstrate the effectiveness of applying superhydrophobic coatings for the prevention of the adhesion of contaminants to a surface, a small-scaled demonstration was conducted. One half of a metallic pan was coated with a superhydrophobic coating and the other half was not coated. A water and salt solution was added to the pan and the water was allowed to evaporate from the pan, leaving only the salt contamination behind. The salt did not adhere to the surfaces coated with the superhydrophobic coating and it was easily removed by inverting the pan. The salt did adhere to the uncoated surfaces and were observed to actually ascend upward over time, along the vertical surfaces above the level of the brine. This salt required mechanical means and a water flush to remove from the uncoated surfaces.

While this disclosure illustrates and enables many examples, they are not to be construed as exhaustive. Accordingly, the invention is intended to embrace those alternatives, modifications, equivalents, and variations as fall within the broad scope of the appended claims. This technology is available for license by the assignee of record.

What is claimed is:

1. An apparatus for purifying a contaminated liquid by evaporative condensation comprising:
    a first vessel for storing the contaminated liquid;
    a second vessel fluidly connected to said first vessel by a conduit and wherein said second vessel accumulates purified liquid that evaporates through said conduit as a liquid vapor from said first vessel;
    a heating device for raising the temperature of the contaminated liquid in said first vessel; and
    wherein said first vessel includes a surface coated with a layer of superhydrophobic material, said surface at least partially in contact with the contaminated liquid such that the contaminants do not adhere to the surface as the purified liquid evaporates.

2. The apparatus as recited in claim 1 wherein the heating device comprises an electrical heating element.

3. The apparatus as recited in claim 1 wherein said heating device comprises a Fresnel lens for focusing solar energy at said first vessel.

4. The apparatus as recited in claim 3 wherein the Fresnel lens is integral with said first vessel.

5. The apparatus as recited in claim 1 wherein the heating device comprises a Fresnel lens for focusing solar energy at a heating element that contacts the contaminated liquid.

6. The apparatus as recited in claim 5 wherein the heating device comprises multiple Fresnel lenses for focusing solar energy at a heating element that contacts the contaminated liquid.

7. The apparatus as recited in claim 1 wherein said second vessel and said conduit each have surfaces that at least partially contact purified liquid and liquid vapor and said surfaces are coated with a layer of superhydrophobic material.

8. The apparatus of claim 1 wherein said conduit is tulip shaped.

9. The apparatus of claim 8 wherein said first vessel and said second vessel are a cohesive structure.

10. The apparatus of claim 8 wherein said first vessel and said second vessel are joined together at a joint.

11. The apparatus as recited in claim 1 wherein said second vessel further comprises a pressure relief valve.

12. The apparatus as recited in claim 1 wherein said second vessel further comprises a valve for removing purified liquid.

13. The apparatus as recited in claim 1 wherein said first vessel is maintained at a temperature T1 and said second vessel is maintained at a temperature of T2 and wherein T1 is greater than T2.

\* \* \* \* \*